United States Patent
Busch-Sorensen (10) Patent No.: US 8,113,435 B2
(45) Date of Patent: Feb. 14, 2012

(54) CARD READER

(75) Inventor: Thomas Busch-Sorensen, San Diego, CA (US)

(73) Assignee: Cubic Corporation, San Diego, CA (US)

(*) Notice: Subject to any disclaimer, the term of this patent is extended or adjusted under 35 U.S.C. 154(b) by 239 days.

(21) Appl. No.: 12/483,110

(22) Filed: Jun. 11, 2009

(65) Prior Publication Data
US 2010/0187308 A1 Jul. 29, 2010

Related U.S. Application Data

(60) Provisional application No. 61/147,951, filed on Jan. 28, 2009.

(51) Int. Cl.
*G06K 19/06* (2006.01)

(52) U.S. Cl. ........ 235/492; 235/375; 235/380; 235/435; 235/487

(58) Field of Classification Search .................. 235/375, 235/435, 487, 492, 380
See application file for complete search history.

(56) References Cited

U.S. PATENT DOCUMENTS

| | | | |
|---|---|---|---|
| 5,613,001 A | 3/1997 | Bakhoum | |
| 5,627,357 A | 5/1997 | Cheng et al. | |
| 6,446,049 B1 | 9/2002 | Janning et al. | |
| 7,185,806 B2 | 3/2007 | Sines | |
| 7,195,173 B2 | 3/2007 | Powell et al. | |
| 7,219,837 B2 | 5/2007 | Rietveld | |
| 7,221,900 B2 | 5/2007 | Reade et al. | |
| 7,308,516 B2 * | 12/2007 | Dressen et al. | 710/110 |
| 7,392,943 B2 | 7/2008 | Rietveld | |
| 2002/0032657 A1 | 3/2002 | Singh | |
| 2002/0087857 A1 | 7/2002 | Tsao et al. | |
| 2004/0100359 A1 | 5/2004 | Reade et al. | |
| 2004/0223481 A1 * | 11/2004 | Juels et al. | 370/345 |
| 2005/0133606 A1 | 6/2005 | Brown | |
| 2005/0236491 A1 | 10/2005 | Leaming | |
| 2006/0032906 A1 | 2/2006 | Sines | |
| 2006/0056622 A1 * | 3/2006 | Liardet et al. | 380/28 |

(Continued)

FOREIGN PATENT DOCUMENTS

DE 102004031092 A1 1/2006

(Continued)

OTHER PUBLICATIONS

Juels et al., "The Blocker Tag: Selective Blocking of RFID Tags for Consumer Privacy", Proceedings of the 10th ACM Conference on Computer and Communications Security, Washington, D.C., Oct. 27-31, 2003; vol. CONF. 10, Oct. 27, 2003, pp. 103-111.

(Continued)

*Primary Examiner* — Daniel Hess
*Assistant Examiner* — Ali Sharifzada
(74) *Attorney, Agent, or Firm* — Kilpatrick Townsend & Stockton LLP (57) ABSTRACT

A card reader system, method, apparatus, and computer program product are disclosed. The card reader can include a transmitter that modulates a radio frequency carrier with a transmit data signal and a receiver that detects a modulation of the radio frequency carrier by a contactless smartcard. A processor can be coupled to the transmitter and the receiver. The processor can generate the transmit data signal so as to simulate a data exchange according to a protocol of the contactless smartcard. The processor can determine a timing for reading data from or writing data to the contactless smartcard and can discontinue the simulated data exchange based on the timing.

30 Claims, 8 Drawing Sheets

U.S. PATENT DOCUMENTS

| | | |
|---|---|---|
| 2006/0065714 A1 | 3/2006 | Jesme |
| 2006/0065731 A1 | 3/2006 | Powell et al. |
| 2006/0226969 A1 | 10/2006 | Bandy |
| 2006/0273176 A1 | 12/2006 | Audebert et al. |
| 2007/0034691 A1 | 2/2007 | Davis et al. |
| 2007/0075145 A1 | 4/2007 | Arendonk |
| 2007/0152052 A1 | 7/2007 | Sines |
| 2007/0267503 A1 | 11/2007 | Dewan |
| 2008/0000987 A1 | 1/2008 | Augustinowicz et al. |
| 2008/0093467 A1 | 4/2008 | Narendra et al. |

FOREIGN PATENT DOCUMENTS

| | | |
|---|---|---|
| EP | 1918859 A1 | 5/2008 |
| WO | WO 01/84861 A1 | 11/2001 |
| WO | WO 04/001657 A1 | 12/2003 |
| WO | WO 2005/052846 A2 | 6/2005 |

OTHER PUBLICATIONS

PCT Partial Search Report dated Mar. 25, 2010; Application No. PCT/US2010/021935; 6 pages.

NXP Semiconductors, Contents, pp. 1-16, NXP Confidential and Proprietary, Version 2.1, Jul. 23, 2008.

PCT International Search Report and Written Opinion mailed May 11, 2010; International Application No. PCT/US2010/021939; 12 pages.

Bundesmant fur Sicherheit in der Informationstechnik, "Messung ger Abstrahleigenschaften von RFID-Systemen (MARS) [Possibilities for passive eaysdropping on an RFID communication]", Projektdokument 1, 2008, pp. 1-33.

De Koning Gans, Gerhard et al., "A Practical Attack of the MIFARE Classic". Institute for Computing and Information Sciences, Radboud University, Nijmegen, The Netherlands, Mar. 2008, 15 pages.

Finke, Thomas et al., "Radio Frequency Identification: Abhormoglichkeiten der Kommunikation zwischen Lesegerat and Transponder am Beispiel eines ISO14443-Systems [Possible eavesdropping of the communication between reader and transponder in an ISO14443 system]", 2006, pp. 1-9.

Hancke, Gerhard P., "Eavesdropping Attacks on High-Frequency RFID Tokens", Jul. 11, 2008, University of Cambridge slideshow, 36 pages.

Hancke, Gerhard P., "Noisy Carrier Modulation for HF RFID", 2007 4 pages.

Hancke, Gerhard P., "Practical Attacks on Proximity Identification Systems", May 26, 2006, University of Cambridge slideshow, pp. 1-19.

Heydt-Benjamin, Thomas S. et al., "Vulnerabilities in First-Generation RFID-enabled Credit Cards", no, 13 pages, 2007.

Juels, Ari et al., "Soft Blocking: Flexible Blocker Tags on the Cheap", RSA Laboratories, Bedford, MA 01730, USA; 2004, 14 pages.

Karygiannis, Tom et al., "Guidelines for Securing Radio Frequency Identification (RFID) Systems", Recommendations of the National Institute of Standards and Technology, U.S. Department of Commerce Special Publication 800-98, Apr. 2007, 154 pages.

Kirschenbaum, Ilan et al., "How to Build a Low-Cost, Extended-Range RFID Skimmer", Feb. 2, 2006, pp. 1-22.

NXP Semiconductors, ISO/IEC 14443 Eavesdropping and Activation Distance: 13.56 MHz proximity smart cards, Application Note, Rev. 01.00-26 Sep. 2007, 25 pages.

Press Release, "Integrated Engineering introduces anti-eavesdropping device", Integrated Engineering Jul. 2005, 2 pages.

Verdult, ing R., "Proof of concept, cloning the OV-Chip Card", 2008, 2 pages.

\* cited by examiner

CARD READER

CROSS-REFERENCES TO RELATED APPLICATIONS

This application claims the benefit of and is a non-provisional of U.S. Provisional Application 61/147,951 filed on Jan. 28, 2009, which is assigned to the assignee hereof and incorporated herein by reference for all purposes.

BACKGROUND

The present application relates generally to communications and, more particularly, to communication with contactless smartcards.

Contactless smartcards are widely used to purchase goods and services. For example, it is now possible to pay for gasoline, groceries, and transit fares simply by waving a contactless smartcard in the vicinity of a card reader. Contactless smartcards provide the cardholder with a quick and convenient way to transfer value and often can be recharged or otherwise linked to a line of credit.

A contactless smartcard communicates with a card reader using electromagnetic radiation. Card transactions often involve an over-the-air exchange of sensitive information such as account numbers and card identifiers. These exchanges are susceptible to eavesdropping which can lead to hacking the smartcard or the theft of its value.

Data encryption can help to reduce the incidence of hacking attacks. However, encryption algorithms can be cracked and are susceptible to unforeseen weaknesses. Moreover, a large body of unencrypted or weakly encrypted cards is currently in circulation.

BRIEF SUMMARY

A card reader system, method, apparatus, and computer program product are disclosed. The card reader can include a transmitter that modulates a radio frequency carrier with a transmit data signal and a receiver that detects a modulation of the radio frequency carrier by a contactless smartcard. A processor can be coupled to the transmitter and the receiver. The processor can generate the transmit data signal so as to simulate a data exchange according to a protocol of the contactless smartcard. The processor can determine a timing for reading data from or writing data to the contactless smartcard and can discontinue the simulated data exchange based on the timing.

In one embodiment, a card reading device is disclosed. The card reading device includes a transmitter configured to modulate a radio frequency carrier of the card reading device with a transmit data signal. The card reading device also includes a receiver configured to detect a modulation of the radio frequency carrier by a contactless smartcard. A processor is coupled to the transmitter and the receiver. The processor is configured to generate the transmit data signal so as to simulate a data exchange according to a protocol of the contactless smartcard. During a period of the simulated exchange, the transmit data signal can include first data representative of outbound communications from the card reading device and second data representative of modulation of the carrier by a contactless smartcard. The processor can be configured to determine a timing for communication with the contactless smartcard and to discontinue the simulated data exchange based on the timing.

In another embodiment, a method of operating a card reading device is disclosed. The method includes modulating a radio frequency carrier of the card reading device with first data according to a communication protocol of a contactless smartcard. The method also includes modulating the carrier with second data generated by the card reading device which represents a simulated response to the first data according to the communication protocol. The method further includes initiating a data exchange with the contactless smartcard at a timing determined by the card reading device. Modulating the carrier with the second data can include modulating the carrier at a sub-carrier frequency and adjusting the modulation characteristics to simulate the capabilities of the contactless smartcard.

In yet another embodiment, a computer readable medium encoded with data and program instructions for execution by a processor is disclosed. The instructions can cause the processor to control operation of a card reader and to perform steps of modulating a radio frequency carrier of the card reader with a first data sequence representative of outbound communications by the card reader. The steps also include adjusting the modulation characteristics of the radio frequency carrier so as to mimic a modulation of the carrier by a contactless smartcard. The steps can also include modulating the radio frequency carrier with a second data sequence representative of a communication from the contactless smartcard using the adjusted modulation characteristics.

In a further embodiment, a method of protecting an exchange between a card reader and a contactless smartcard is disclosed. The method includes modulating a radio frequency carrier of the card reader with a first data sequence and determining the timing of an expected response to the first data sequence based on a protocol of the contactless smartcard. The method includes modulating the radio frequency carrier at a sub-carrier frequency used for communication by the contactless smartcard with a second data sequence prior to the time of the expected response, wherein the second data sequence is unrelated to communication with the contactless smartcard. The method can also include modulating the carrier at the sub-carrier frequency with a third data sequence comprising jamming data generated by the card reader to coincide with the time of the expected response.

Additional aspects of the invention will become apparent from the following description and the accompanying drawings.

DETAILED DESCRIPTION

The ensuing description provides preferred exemplary embodiment(s) only, and such preferred exemplary embodiments are not intended to limit the scope or applicability of the present invention. Rather, the ensuing description will enable those who are skilled in the art to implement such preferred exemplary embodiment(s). Persons of skill in the art will recognize that various changes may be made in the function and arrangement of elements without departing from the scope of the invention as it is set forth in the appended claims.

Figure 1:
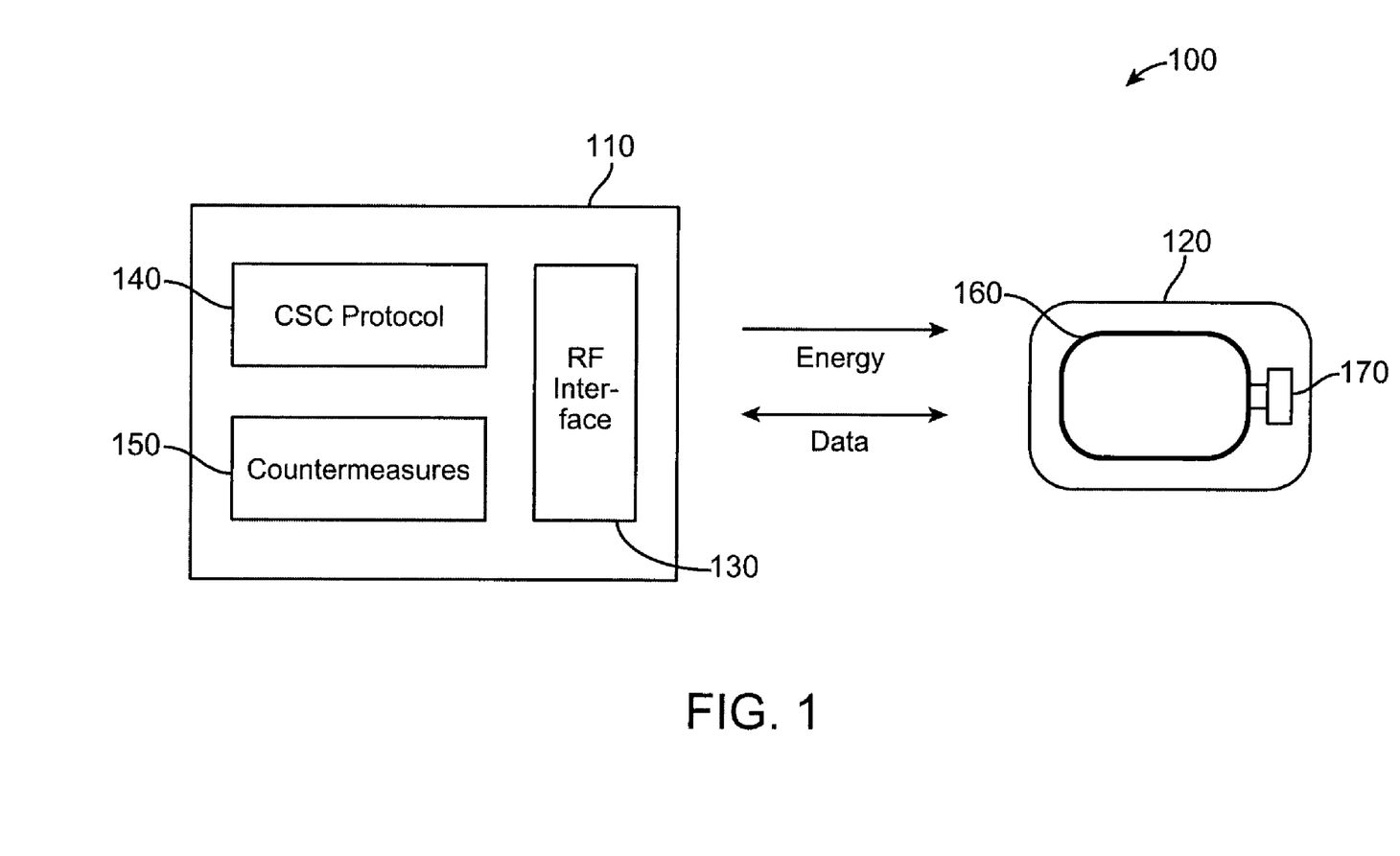
FIG. 1 shows an embodiment of a card reader system.

FIG. 1 shows a card reader system 100 according to one embodiment of the present invention. As illustrated, card reader system 100 includes a card reader 110 and a contactless smartcard 120. Card reader system 100 can be used for ticketing or similar transactions in which a contactless smartcard is presented to a card reader to gain access to services. For example, card reader system 100 can be located at a transit station gate for admitting passengers to the transit system. Of course, card reader system 100 is not limited to a particular application but can include any exchange of data between a smartcard and a card reader. Other applications of card reader system 100 can include sales transactions with contactless credit cards as well as access control and security systems.

Card reader 110 and contactless smartcard 120 (also referred to as "card" or "smartcard") communicate wirelessly. Communication between the devices can be according to a contactless smartcard (CSC) protocol. The CSC protocol can be standards-based or proprietary. For example, the CSC protocol can be based on the ISO 14443 standards for proximity cards. Within the ISO 14443 standards, a contactless smartcard can be further defined as a Type A or Type B based on the manner in which it communicates.

Alternatively, the CSC protocol can be as described in the EMV standard (Europay, MasterCard, and Visa), or some other industry standard for contactless smartcard communications. In some embodiments, the CSC protocol can be proprietary or can include proprietary elements such as commands and data structures. For example, contactless smartcard 120 can be a Mifare® Ultralight or Mifare® Classic card from NXP Semiconductor and card reader 110 can be configured to communicate using commands and data structures which are appropriate for such cards.

Contactless smartcard 120 is shown as including an antenna 160 and an integrated circuit 170. Antenna 160 can be tuned to a carrier frequency of card reader 110. For example, with ISO 14443 cards, antenna 160 can be a magnetic loop antenna that has been adapted for use with a 13.56 MHz carrier. Integrated circuit 170 is coupled to antenna 160 and can be powered by energy from the radio frequency carrier. In operation, card 120 can communicate with card reader 110 through modulation of the RF carrier. For example, Type A cards can send data to card reader 110 by load-modulating the RF carrier at 847 kHz sub-carrier frequencies (i.e., 12.71 MHz, 14.41 MHz).

Integrated circuit 170 can also implement the CSC protocol which governs communication with card reader 110. Typically, integrated circuit 170 includes a memory or other storage for retaining card data. Data exchanges between devices can be based on precision pulse timing in which contactless smartcard 120 receives a command from card reader 110 and responds to the command at a precisely determined time specified by the CSC protocol. "Exchanges" in card reader system 100 can involve detecting the presence of the smartcard 120 at the card reader 110, mutual authentication based on a key-exchange, as well as reading data from and writing data to the card's storage. As used herein, "transaction" can refer to a series of one or more exchanges between smartcard 120 and card reader 110. Transactions can be described as successful when the exchanges proceed normally, or as failed when the exchanges are halted such as through communication errors, invalid commands, unsuccessful authentication, and the like.

Card reader 110 is shown as having an RF interface 130, a CSC protocol controller 140, and a countermeasures processor 150. RF interface 130 can include transmit and receive circuitry for communicating with contactless smartcard 120. For example, RF interface 130 can include a transmitter that modulates the RF carrier with transmit data and a receiver that detects inbound data from smartcard 120. In an exemplary embodiment, card reader 110 is a multi-protocol device similar to the Tri-Reader® family of products from Cubic Transportation Systems, Inc.

In some embodiments, CSC protocol controller 140 sources the outbound (transmit) data to RF interface 130 and RF interface 130 modulates the RF carrier based on the outbound data it receives. CSC protocol controller 140 can include one or more programmable logic elements such as microprocessors, microcontrollers, field-programmable gate arrays (FPGA), application-specific integrated circuits (ASIC), complex programmable logic devices (CPLD), and the like. CSC Protocol controller 140 can also be configured to determine a precise timing of communications based on the CSC protocol of smartcard 120 and to direct the exchange of commands and data.

RF interface 130 can also detect inbound communications from smartcard 120. For example, Type A cards can load-modulate the RF carrier with Manchester coded data at predetermined sub-carrier frequencies. Type B cards communicate with the card reader 110 by phase-modulating the carrier. CSC protocol controller 140 can be configured to detect the type of card and to demodulate the inbound (receive) data based on the CSC protocol utilized. Depending upon the CSC protocol, CSC protocol controller 140 can also determine an expected timing and content of card responses.

Countermeasures processor 150 ("processor") coordinates the operation of CSC protocol controller 140 and RF interface 130 to counter eavesdropping on exchanges with smartcard 120. Although shown separately, the functions of processor 150 and CSC protocol 140 may be performed by common hardware. For example, with Mifare® Classic cards, processor 150 may include a proprietary cryptography module used in connection with key exchanges and similar operations.

Processor 150 can be configured to counter snooping or hacking attacks on card transactions by generating false triggers and obfuscating the exchange of data. In one embodiment, processor 150 generates data to simulate both sides of a card transaction. For example, processor 150 may cause CSC protocol controller 140 to initiate communication with a non-existent smartcard. Processor 150 can direct CSC protocol controller 140 and RF interface 130 to modulate the RF carrier with outbound data such as a wake-up command or a card selection command for the non-existent card.

Processor 150 can also direct CSC protocol controller 140 to simulate a response from the non-existent card. This can involve causing RF interface 130 to amplitude modulate the RF carrier so as to mimic inbound data from the non-existent card. With Type A cards, for example, RF interface 130 can amplitude modulate the 13.56 MHz RF carrier at the 847 kHz sidebands and do so with modulation characteristics which approximate the operation of an actual smartcard. All data in the simulated exchange can conform to requirements of the CSC protocol, but it may be fictitious in nature and therefore worthless to a hacker. After a predetermined time, the simulation can be discontinued and card reader 110 can initiate an actual transaction with smartcard 120. The duration of the simulated exchange can be varied for each card that is presented at the card reader 110.

Processor 150 can also exploit characteristics of the CSC protocol to frustrate attempts at eavesdropping on communications with smartcard 120. For example, with MiFare® cards, a timing of the card's response following a command can be precisely known. After a command is issued, card reader 110 will have the opportunity to simulate inbound data that is irrelevant to the transaction, without disturbing the signal from the card From an eavesdropper's perspective, card reader 110 greatly increases the difficulty of intercepting and analyzing a card transaction. Beyond creating a large number of false triggers, an eavesdropper cannot assume that data at a given position in a transaction has a particular significance. Such data may be part of a simulated transaction or it may be entirely irrelevant to the transaction. Similarly, data obtained by eavesdropping may be the result of an invalid command or it may be bogus keying material. Processor 150 can be configured to vary the "suite" of countermeasures employed each time a card is presented at card reader 110. Thus, presenting the same card twice will not reduce the complexity of snooping on a transaction.

Figure 2:
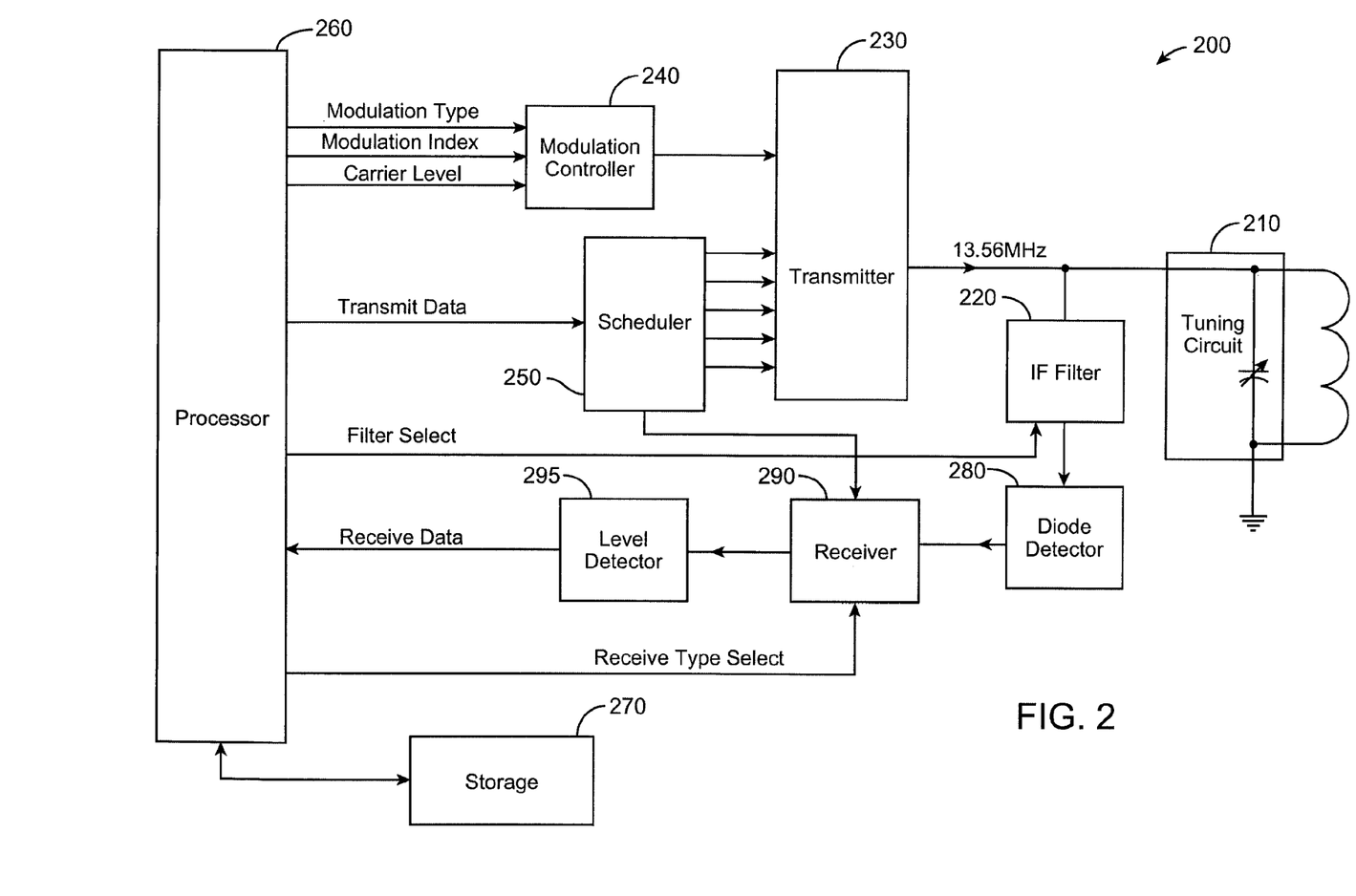
FIG. 2 is a block diagram of an embodiment of a card reading device.

FIG. 2 is a block diagram of a card reading device ("card reader") 200 according to one embodiment of the present invention. Card reader 200 can be similar to card reader 110 and can function as part of card reader system 100 in the manner previously described.

As shown, card reader 200 communicates using antenna 210. Antenna 210 can include a tuning circuit and a coil. The tuning circuit can include a variable capacitance or like elements with which to adjust a resonant frequency of antenna 210. For example, antenna 210 can be tuned to operate at 13.56 MHz for ISO 14443 cards or to some other frequency when implementing different CSC protocols.

Antenna 210 is coupled to a transmitter 230. Transmitter 230 can include an oscillator and can drive antenna 210 to produce the RF carrier. Transmitter 230 can also be coupled to a modulation controller 240 and a scheduler 250. Modulation controller 240 can output a supply voltage and can determine a level of the RF carrier, a type of modulation, and a modulation level of the transmit signal. For example, when communicating with Type A cards, transmitter 230 can modulate the RF carrier with the transmit data using an on-off keying (100% modulation). With Type B cards, modulation of the RF carrier can be determined by a modulation index and typically ranges from around 8%-15%.

IF Filter 220 is disposed between antenna 210 and transmitter 230. Filter 220 can operate at different frequencies as determined by an input select signal. In the embodiment shown, these operating points include the 13.56 MHz carrier frequency and a 14.41 MHz sideband. Of course, different frequencies can be used with different card types. The intermediate frequency output of filter 220 can be rectified by a diode detector 280 and delivered to a receiver 290. Receiver 290 can demodulate the rectified IF signal to produce receive data. A select input to receiver 290 can specify the type of demodulation to be performed. For example, amplitude modulation for Type A cards or phase modulation for Type B cards. A level detector 295 coupled to receiver 290 can automatically adjust the receive data signal for use by processor 260.

Processor 260 can control the overall operation of card reader 200 and may include a microprocessor, microcontroller, field-programmable gate array, application-specific integrated circuit, complex programmable logic device, or like hardware elements. Processor 260 can be configured to execute fixed or programmable instructions in connection with implementing the CSC protocols, eavesdropping countermeasures, and other functions of card reader 200.

Processor 260 can be coupled to one or more storage elements 270. Storage elements 270 can include random access memory (RAM), read-only memory (ROM), flash memory, hard disk drives, optical drives, and other computer-readable storage media encoded with data and program instructions that are accessible to processor 260. In one specific embodiment, the present invention includes a computer program product comprising a computer-readable storage medium encoded with instructions for carrying various of the operations described herein.

Processor 260 can send outbound data to transmitter 230 on a transmit path that includes scheduler 250. Scheduler 250 can receive the transmit data from processor 260 and schedule it for transmission. Processor 260 can also determine a type of modulation to be applied to the transmit data and a modulation index by signaling to modulation controller 240. By adjusting the modulation index and the type of modulation, processor 260 can implement different CSC protocols for conducting card transactions as well as a range of eavesdropping countermeasures.

In one embodiment, the modulation type output specifies whether transmitter 230 should treat the transmit data as outbound data or as simulated inbound data. Outbound data can be used to amplitude modulate the RF carrier frequency according to the modulation index value. When the modulation type indicates simulated inbound data, transmitter 230 can modulate the transmit data so as to mimic a card response. For example, when it is desired to simulate inbound data from a Type A card, transmitter 230 can modulate the RF carrier at an appropriate sub-carrier frequency. Alternatively, with Type B cards, phase-modulated data can be simulated. When simulating inbound data, the modulation index can be used to reduce the modulation level of the simulated data to approximately 5% of the carrier or some other value that is consistent with the capabilities of an actual smartcard.

Figure 3A:
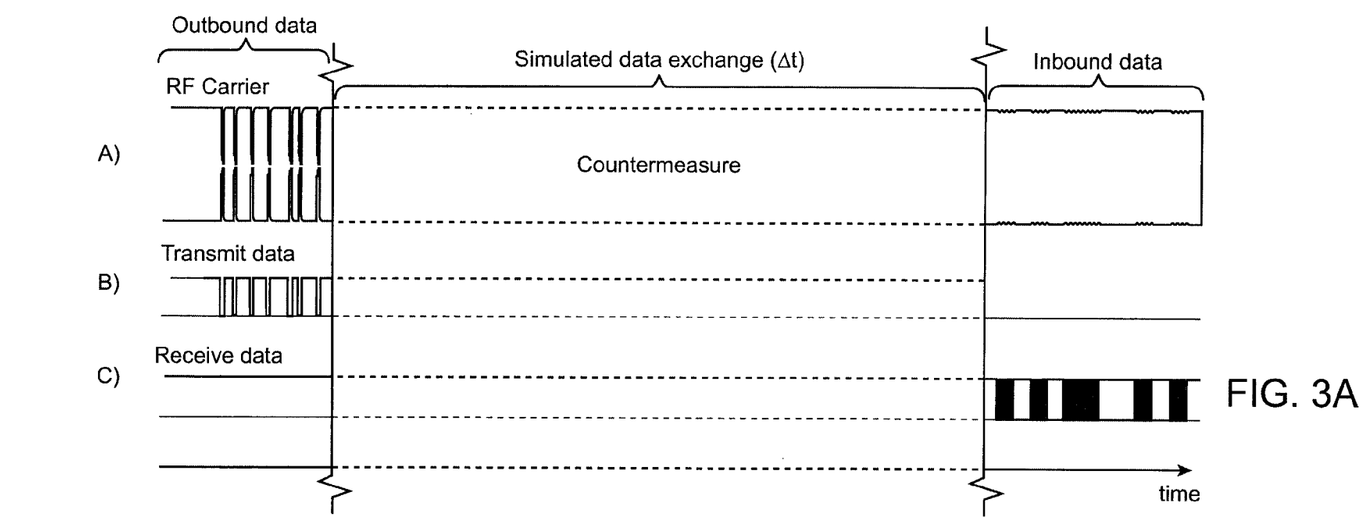
FIGS. 3A-3B show an operation of the card reading device in which simulated inbound data is added to a card transaction.
Figure 3B:
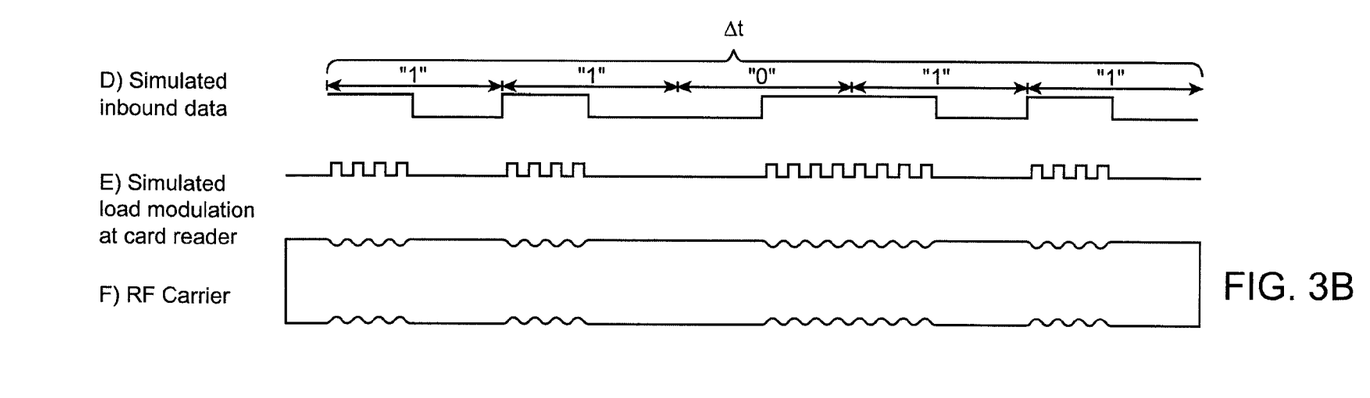

FIGS. 3A-3B illustrate an eavesdropping countermeasure such as can be employed by card reader 200. For purposes of discussion, a Type A card transaction will be illustrated in the following examples. However, similar principles can be used with Type B cards as well as with various proprietary CSC protocols.

In FIG. 3A, item (a) shows the RF carrier which powers the Type A smartcard and serves as the communication medium for the card transaction. Item (b) shows outbound transmit data from processor 260 which can, for example, be a wake-up or other command. Based on the CSC protocol, processor 260 determines that a smartcard will respond after interval $\Delta t$. For example, with some Mifare® cards, the response to a wake-up (WUPA) command is expected approximately 80 µs after the command is issued. In that case, a countermeasure lasting up to 80 µs can be inserted before the expected response time.

As shown, the RF carrier in item (a) is modulated with transmit data (b) using a modulation index of approximately 100% to create a type of on-off keying. The card responds to the transmit data (b) following interval $\Delta t$ by load modulating RF carrier (a). This is illustrated by small changes or ripples in the RF carrier. The receive circuitry of card reader 200 filters and demodulates the card-data. Item (c) depicts demodulated and level-adjusted receive data such as can be delivered to processor 260.

FIG. 3B shows an eavesdropping countermeasure employed during the interval $\Delta t$. The eavesdropping countermeasure occurs after outbound transmit data (b) is sent but before the arrival of the expected card response represented by receive data (c). During the interval Δt, processor 260 adjusts the modulation type and modulation index at modulation controller 240 and produces simulated inbound data. Item (d) shows the simulated inbound data with Manchester coding such as might be used with a Type A countermeasure. Item (e) shows modulation of the simulated inbound data at the 847 kHz sub-carrier such as can be produced by transmitter 230. Lastly, item (f) shows a part of the RF carrier that is modulated with the simulated inbound data. Thus, during the interval Δt, an eavesdropper is presented with a series of false triggers and with simulated card data that originates from card reader 200.

Figure 4:
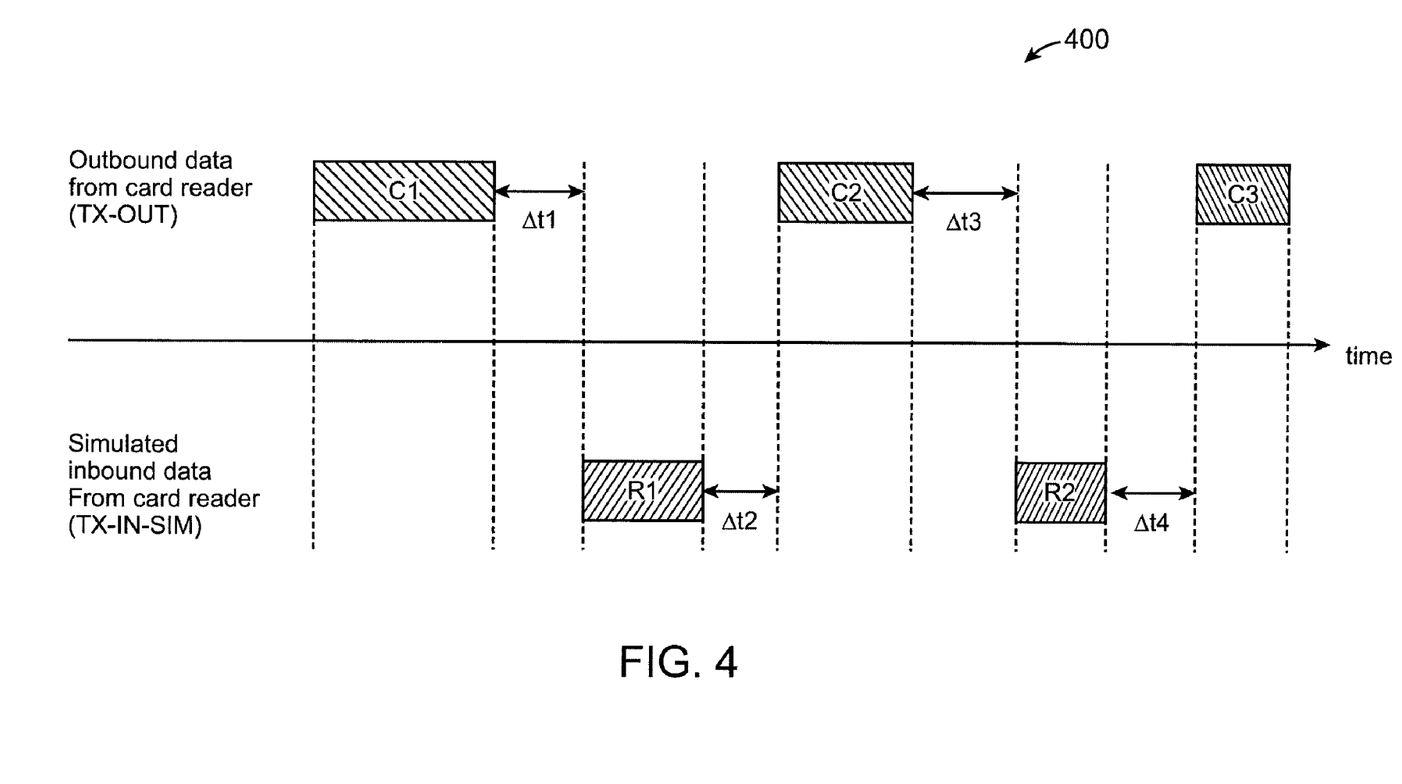
FIG. 4 shows aspects of a simulated exchange performed by the card reading device.

FIG. 4 illustrates an exemplary operation of card reader 200 involving a series of simulated exchanges. In the figure, card reader 200 simulates data exchanges with a non-existent card. Card reader 200 can generate the simulated data exchanges before, during, or after an actual smartcard is presented. For example, simulated exchanges before and after an actual card is presented increase the difficulty of identifying the start of an actual card transaction and of isolating card data. As discussed herein, simulated exchanges can also be initiated during a transaction with an actual card by issuing a HALT command or some other command sequence known to disable smartcard communications. In this way, simulated exchanges can be generated while the actual card is idle or halted.

Outbound transmissions (TX-OUT) represent card reader command sequences. The command sequences may or may not correspond to valid commands of the CSC protocol but will typically have the same physical characteristics as actual card reader commands. For example, commands (C1, C2, C3) for Type A cards will be expressed with on-off keying of the RF carrier whereas commands (C1, C2, C3) for Type B cards will be expressed by amplitude modulation with the appropriate modulation index. As a result, outbound transmissions (TX-OUT) used in the simulated exchanges are largely indistinguishable at the physical level, and possibly at the logical level, from commands used to communicate with an actual smartcard.

Simulated inbound transmissions (TX-IN-SIM) likewise may or may not correspond to valid card responses, but will typically have the same physical characteristics as actual responses. For example, with Type A cards, the simulated inbound transmissions can have a modulation index corresponding to the load modulation level of an actual card and can use a modulation type specifying an appropriate sub-carrier frequency.

In the present example, processor 260 orchestrates the simulated exchanges by transmitting command C1 with a modulation index and modulation type corresponding to signals from the card reader. Processor 260 then changes the modulation type and modulation index to reflect a card response and schedules data for response R1. After interval Δt1, card reader 200 simulates inbound data by modulating the RF carrier with the data for response R1. Response R1 may or may not be related to command C1. For example, command C1 could be a request command (REQA) to a Mifare® Ultralight card and response R1 could include a simulated card identifier. Alternatively, C1 and R1 could represent portions of a key exchange in which R1 comprises bogus keying material. In some embodiments, card reader 200 can be configured to detect bogus keying material offered during an actual card exchange and to generate an alarm.

Processor 260 changes the modulation type and modulation index back to values corresponding to the card reader and schedules a second command C2 for transmission. After the interval Δt2, card reader 200 transmits command C2. This process is then repeated for the second response R2 and the third command C3. Processor 260 can be configured to vary the length and timing of the simulated exchange for each card detected at card reader 200. In this way, the card transaction is made unpredictable to an eavesdropper.

Simulated exchanges can also be initiated after a card is physically presented at card reader 200. In such cases, it may be desirable to suspend operation of the card while the simulated exchanges are played out and to reactivate the card at a timing that is determined by the card reader. Card reader 200 can suspend and resume card operation based on the CSC protocol and the internal operation of card devices.

Figure 5:
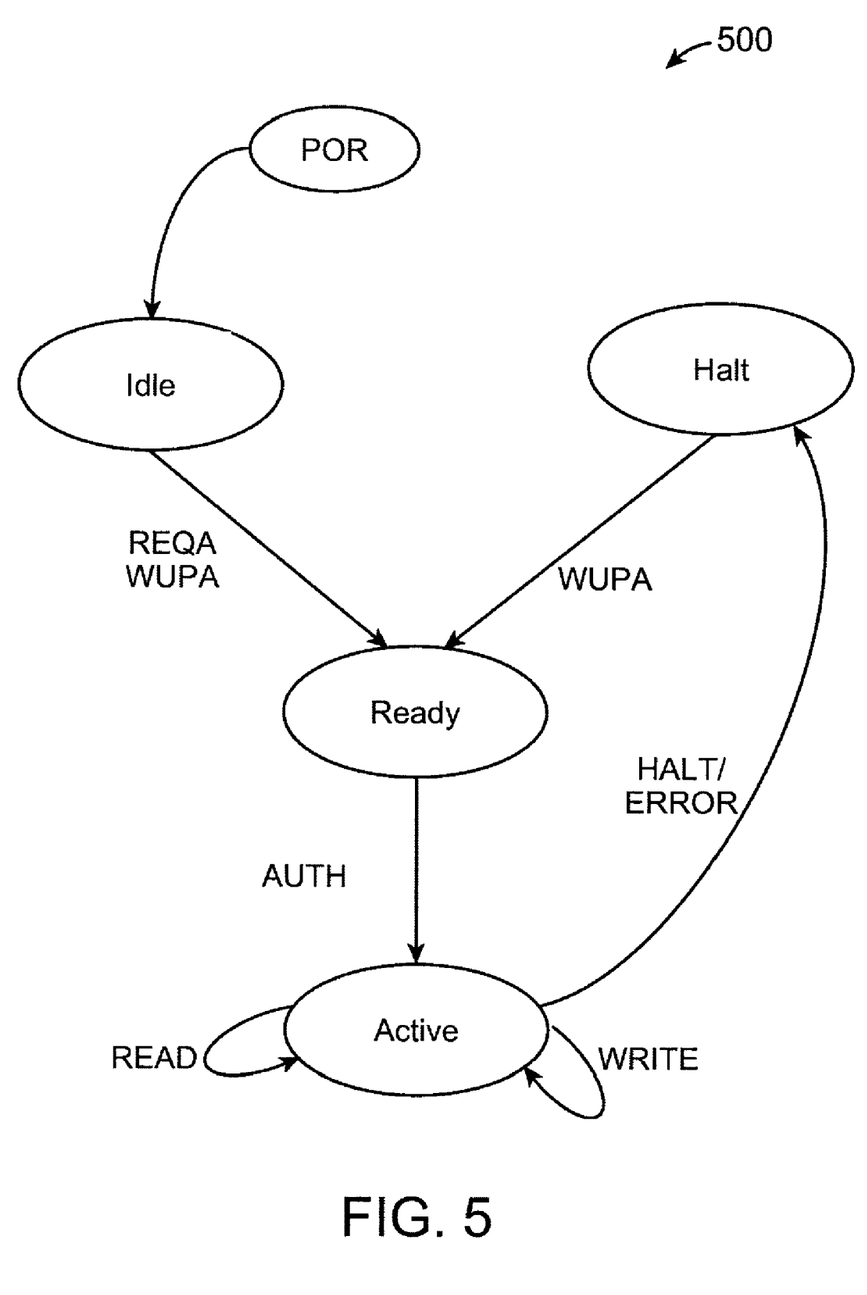
FIG. 5 illustrates exemplary card functionality in relation to which the card reading device can perform a simulated data exchange.

FIG. 5 is a state diagram 500 of exemplary smartcard functionality which can be manipulated by card reader 200 in conducting a simulated data exchange. State diagram 500 is similar to that of a one type of Mifare® card and will therefore be discussed in terms of the Mifare® command set. However, it will be understood that the present disclosure is not limited to Mifare® cards, but can be implemented at card reader 200 in connection with other standards-based or proprietary CSC protocols and cards.

In this exemplary case, when the card is first activated, it transitions from a power-on reset state POR to the IDLE state where it waits for either of two commands. Upon receiving a request REQA or wake up WUPA command, the card transitions to a READY state. In the READY state, the card and reader carry out a mutual authentication procedure. Authentication can involve the exchange of keying material which may be tied to a unique identifier of the card. Upon successful authentication, the card enters the ACTIVE state at which time the card can respond to READ and WRITE commands. In the ACTIVE state, the card can be placed into the HALT state by an explicit HALT command or upon the occurrence of certain error conditions. When halted, the card will respond only to a wake up WUPA command and will interpret other data as an error.

Card reader 200 can interrupt a card during a transaction and generate a simulated data exchange while card operation is suspended. For example, after a card has been presented at card reader 200, processor 260 can add a HALT command to the transmit data. As an alternative to issuing an explicit HALT command, processor 260 can transmit an invalid command or sequence of commands known to give rise to an error condition at the card such that the card returns to the HALT or IDLE operating state. When operation of the card is suspended, processor 260 can orchestrate a simulated exchange as discussed in connection with FIG. 4. Following the simulated data exchange, the card can be reactivated with a wake up WUPA, request REQA, or other appropriate command.

Figure 6:
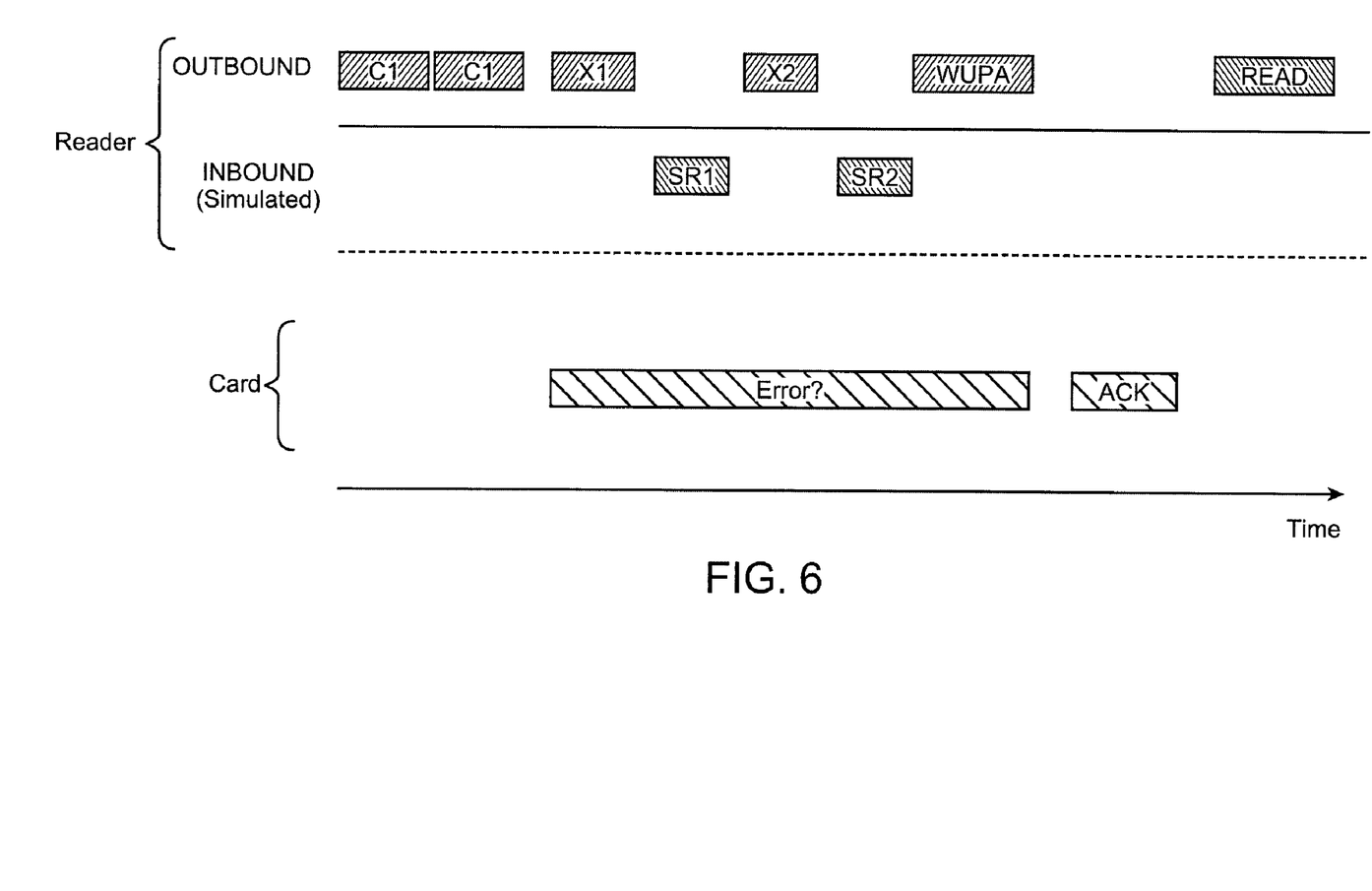
FIG. 6 shows an interaction between the card reading device and a contactless smartcard.

FIG. 6 illustrates a further eavesdropping countermeasure that can be employed by card reader 200. In the example, card reader 200 issues a valid command (C1) ostensibly to provoke a response from the card. However, card reader 200 then issues a second identical command before a response is expected from the card. As shown, a second C1 command is issued. The second identical command disrupts an eavesdropper's ability to identify a timing of subsequent exchanges in the transaction and may create an error condition at the card.

At this point, card reader 200 can proceed to generate simulated exchanges or to transmit random values. For example, card reader 200 can transmit additional valid or invalid commands X1, X2 and can simulate card responses SR1, SR2 to these additional commands. Alternatively, card reader 200 can modulate the RF carrier with random outbound data or it can simulate random inbound data. Thereafter, depending upon the requirements of the CSC protocol, any error conditions that may have been created can be cleared before proceeding. In the present example, a wake up command WUPA is issued to bring the card out of the error state. Following acknowledgement ACK by the card, the transaction proceeds with a READ or other appropriate command.

In addition to the preceding countermeasures, card reader 200 can selectively jam card transmissions. In some embodiments, jamming is a process in which the card reader 200 transmits data at a time when the card is also transmitting. The outbound and inbound signals may collide and can interfere either constructively or destructively. When the signals interfere destructively, it can be difficult or impossible to recover the card data from the RF carrier. For an eavesdropper, the collisions create uncertainty and can limit the ability to recover sensitive information from a card transaction. For example, if card reader 200 generates four destructive collisions during a 48-bit key exchange, a hacker has only a 1/16 chance of guessing the correct 48-bit key sequence.

Figure 7:
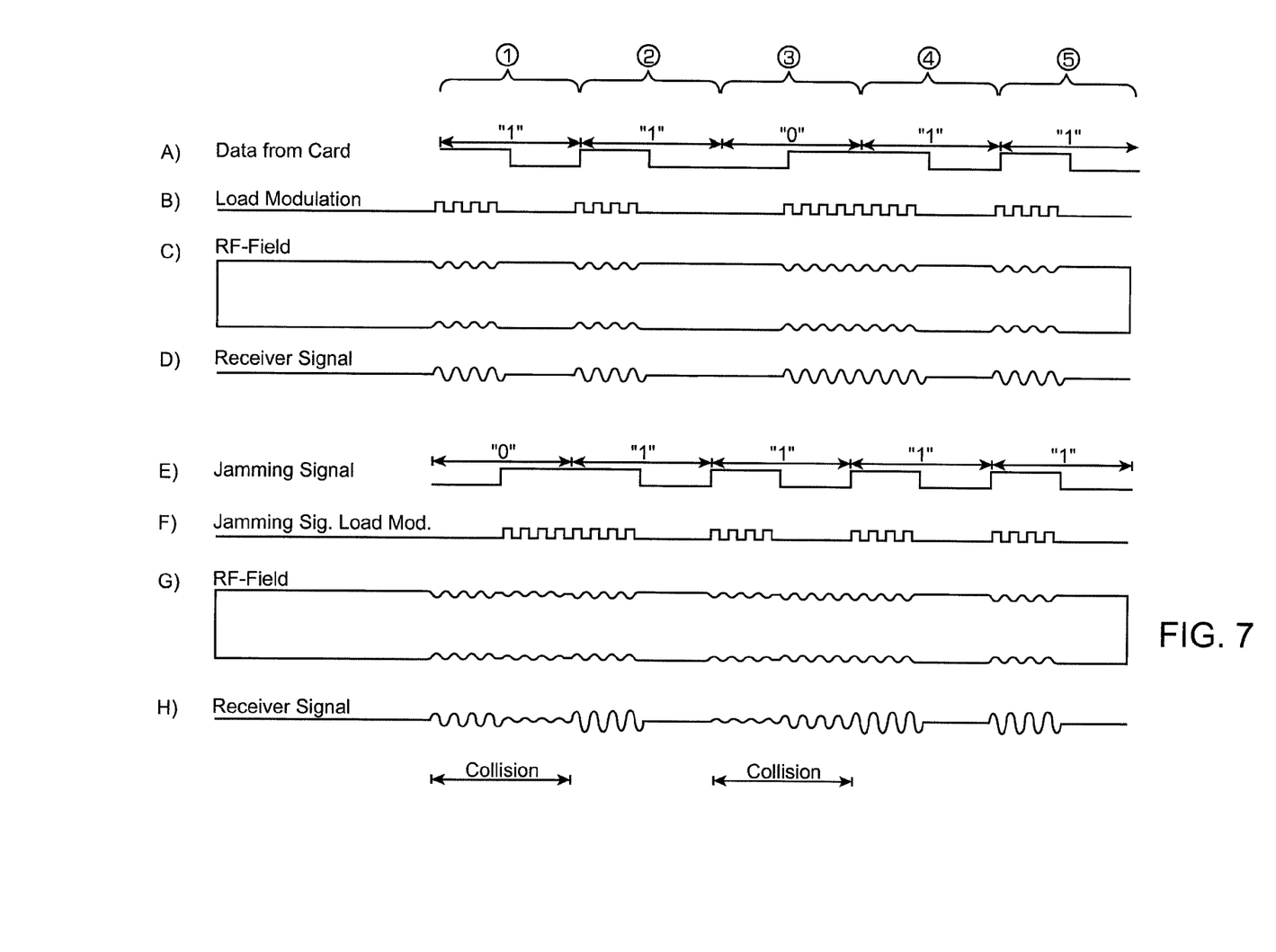
FIG. 7 illustrates aspects of a jamming countermeasure of the card reading device.

FIG. 7 illustrates aspects of a jamming countermeasure such as can be employed by card reader 200. Items (a)-(b) represent data transmitted by a smartcard during a transaction. As shown, the card transmits Manchester coded binary data (a) by load modulating (b) the RF carrier (c) at a sub-carrier frequency. The effect of the load modulation of RF carrier (c) is recovered in the IF signal (d) output from filter 220 at card reader 200. Items (a)-(d) show the exchange before application of the jamming countermeasure.

With reference to FIG. 2, processor 260 can initiate a jamming countermeasure at any point during a transaction by scheduling the transmission of jamming data. Depending upon the requirements of the CSC protocol, for example, processor 260 can selectively jam transmissions during a sensitive part of a card transaction such as when keying material is exchanged during authentication. Processor 260 can determine the timing of a particular card response and can output a jamming data sequence to scheduler 250 for outbound transmission. The modulation type and modulation can be set to match inbound communications from the smartcard. Scheduler 250 can precisely time modulation of the jamming data to coincide with a targeted portion of the exchange.

While the jamming countermeasure is active, receiver 290 can detect collisions and infer the data value sent by the card based on knowledge of the jamming data. For example, if a destructive collision is detected when a '1' value of the jamming data was transmitted, receiver 290 can infer that the card sent a '0' during that bit period and can output a '0' to processor 260 in the receive data signal. Alternatively, receiver 290 can be configured simply to discard the collision data without attempting to determine the card's response.

Returning to FIG. 7, items (e)-(h) illustrate the effect of the jamming countermeasure. It can be seen that the exemplary card data of item (a) includes the Manchester sequence '11011' distributed over bit periods ①-⑤. Item (e) shows the jamming data output by processor 260 ('01111') and item (f) shows the corresponding sub-carrier modulation produced by card reader 200. Item (g) illustrates the combined effect of the jamming data (e) and the card data (a) on the RF carrier (g). Lastly, item (h) represents the IF signal recovered from the RF carrier (g) during the active jamming interval.

During bit interval ①, the value of the card data is '1' and the value of the jamming data is '0'. The result is a destructive collision represented by a reduced level of the receiver signal (h). When the destructive collision is detected, receiver 290 can either infer that the card sent a '1' based on knowledge of the jamming data, or it can signal an indeterminate value at the bit position. Similarly, during bit interval ③, a destructive collision results when the card transmits a '0' and the jamming data transmitted by card reader 200 is a '1'. Note that the receiver signal during bit intervals ②, ④, and ⑤ is not affected by interference between the outbound jamming signal and the inbound card data.

As a further disruption to eavesdropping, processor 260 can vary the amplitude of the RF carrier over time. The inventor of the present application has discovered that a typical smartcard will tolerate variation of the RF field on the order of approximately 20% or more. Such variation, for example, can result when the card is introduced to the RF field at different angles and distances from the card reading device. Processor 260 can vary the RF carrier using the carrier level output to modulation controller 240. In response to changes in the carrier level, modulation controller 240 changes the amplitude of the RF carrier within a predetermined operating range. Varying the level of the RF carrier complicates the process of snooping on card transactions and can be performed each time a card is presented to card reader 200 or even during the course of a card transaction.

Figure 8:
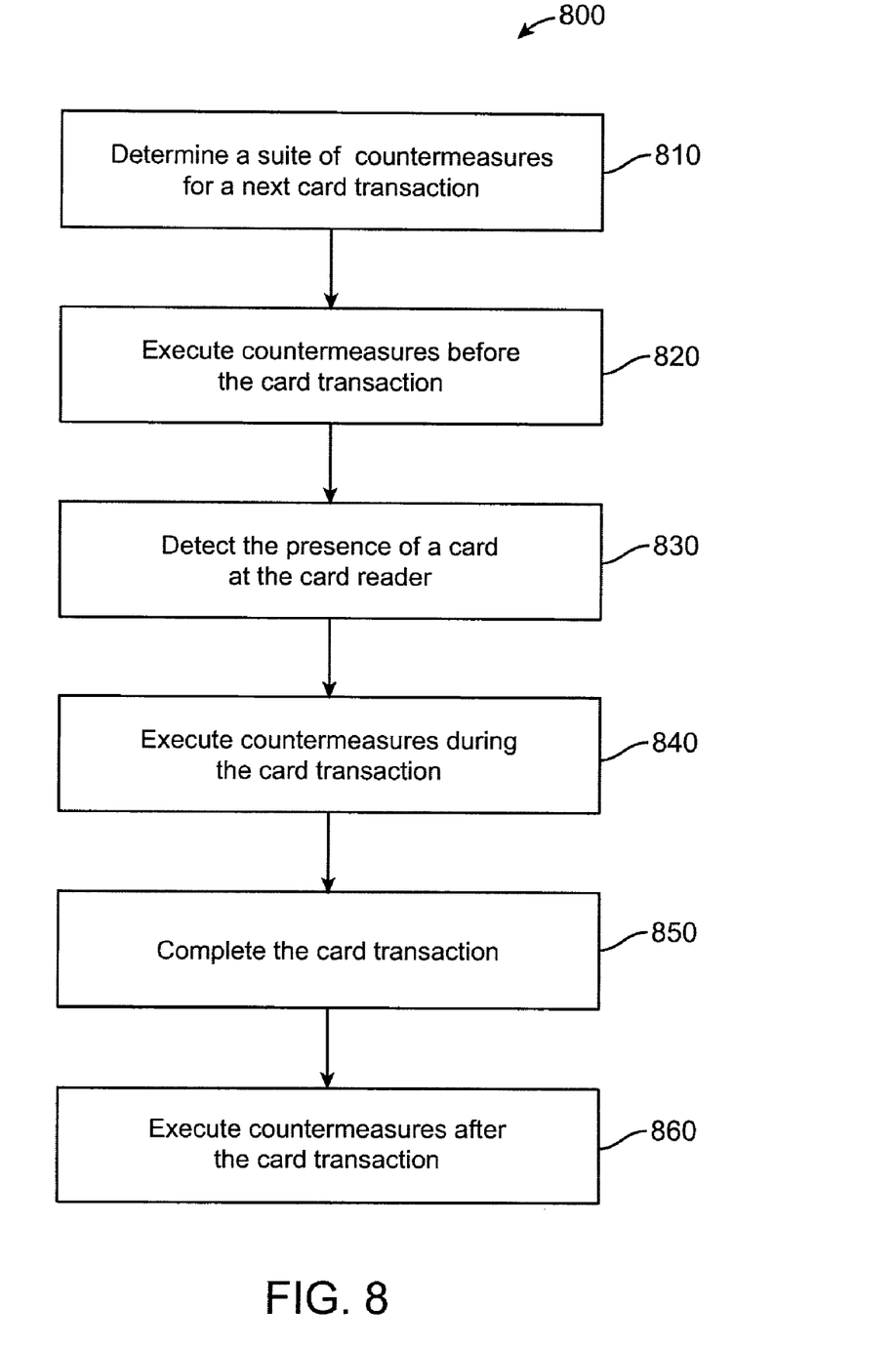
FIG. 8 shows one embodiment of a process of the card reading device.

FIG. 8 is a flowchart 800 showing steps performed by a card reader during a card transaction according to embodiments of the present invention. These steps can be performed by card reader 200 and, in particular, can be implemented by processor 260 through a combination of hardware and software elements.

At block 810, the card reader determines a suite of countermeasures to be employed during a next card transaction. The suite of countermeasures can include one or more of the countermeasures discussed herein and the countermeasures can be implemented before, during, and after the card transaction. A different suite of countermeasures can be selected for each card transaction. Also, in some embodiments, different countermeasures can be selected for use with different types of cards and different CSC protocols. For example, countermeasures for use with Type A cards can differ from those used with Type B cards, Mifare® Ultralight countermeasures may differ from Mifare® Classic measures, and so on.

At block 820, countermeasures can be executed before a card is presented at the card reader. Such countermeasures can include modulating the RF carrier in a random fashion at a frequency used by the card for communicating with the card reader. With Type A cards, for example, a 13.56 MHz carrier could be modulated at its 847 kHz sidebands with random data to create false triggers for a would-be eavesdropper. Alternatively or additionally, the card reader could simulate either or both sides of a fictitious card transaction.

At block 830, a card is detected at the reader when it responds to a wake-up or similar command or following an anti-collision procedure. At block 840, when the card has been detected, countermeasures can be executed in connection with a card transaction. The card reader can simulate card transmissions at pauses determined according to the CSC protocol. For example, spurious data can be transmitted to simulate inbound data from the card without disrupting the card's ability to respond to commands.

Alternatively, during the card transaction, the card reader can issue a HALT or similar command to suspend the card's operation, generate a simulated data exchange, and then reactivate the card at a timing determined by the card reader. In like manner, an invalid command or sequence of commands can be used to purposefully suspend card operation so that the card reader can play out a simulated data exchange. During the simulated data exchange, the card reader can also distribute bogus keying material which, in turn, can be registered for tracking purposes.

The card reader can also jam communications which occur during the card transaction. For example, per the discussion at FIG. 7, the card reader can selectively jam parts of a card's response to reduce the probability that card data can be completely recovered by an eavesdropper. In some embodiments, the card reader determines the length and timing of the jamming transmission to ensure a minimum number of destructive collisions.

At block 850, the card transaction is complete. For example, data may have been successfully read from or written to the card or the card transaction may have failed. As a further protection, the card reader may continue to execute countermeasures even after the transaction is concluded. Such countermeasures could include random modulation of the RF carrier to simulate inbound card data, valid but useless commands issued to the card, continuing with a simulated data exchange, or any other action for creating false triggers and obfuscating the actual card transaction.

As will be understood by those skilled in the art, the present invention may be embodied in other specific forms. Those skilled in the art will recognize, or be able to ascertain using no more than routine experimentation, many equivalents to the specific embodiments of the invention described herein. Such equivalents are intended to be encompassed by the following claims.

What is claimed is:

1. A card reading device, comprising:
   a transmitter configured to modulate a radio frequency carrier of the card reading device with a transmit data signal;
   a receiver configured to detect a modulation of the carrier by a contactless smartcard and to generate a receive data signal therefrom; and
   a processor coupled to the transmitter and the receiver, the processor configured to generate the transmit data signal so as to simulate a data exchange according to a contactless smartcard protocol, the transmit data signal being generated to communicate outbound communications from the card reading device and to simulate inbound communications to the card reading device from the contactless smart card, the processor being further configured to determine a timing for communicating with the contactless smartcard and to discontinue the simulated data exchange based on the timing.

2. The card reading device of claim 1, wherein the processor is configured to communicate with the contactless smartcard by reading data from the contactless smartcard and writing data to the contactless smartcard.

3. The card reading device of claim 1, wherein the transmit data signal includes first data representative of the outbound communications from the card reading device and second data representative of modulation of the carrier by the contactless smartcard to simulate the inbound communications during a period of the simulated data exchange.

4. The card reading device of claim 3, wherein the transmitter is configured to modulate the carrier at a sub-carrier frequency based on the contactless smartcard protocol when the transmit data signal includes the second data.

5. The card reading device of claim 1, wherein the processor is configured to detect a communication from the contactless smartcard based on the receive data signal and to generate third data for the transmit data signal, the third data being unrelated to the communication and conforming to requirements of the contactless smartcard protocol.

6. The reading device of claim 5, wherein the third data comprises bogus keying material.

7. The card reading device of claim 3, wherein the second data comprises at least one command that is invalid based on the contactless smartcard protocol.

8. The card reading device of claim 3, wherein the second data comprises at least two identical commands.

9. The card reading device of claim 1, wherein the transmitter is configured to vary an amplitude of the carrier from time to time.

10. The card reading device of claim 1, wherein the protocol of the contactless smartcard is based on ISO 14443 standards.

11. The card reading device of claim 1, wherein the processor is configured to vary a timing of the simulated data exchange each time a contactless smartcard is detected at the card reading device.

12. The card reading device of claim 1, wherein the processor is configured to determine a timing of an expected communication from the contactless smartcard comprising a plurality of values and to generate the transmit signal so as to coincide in time with one or more values selected from the plurality of values of the expected communication.

13. The card reading device of claim 12, wherein the processor is configured to detect a collision at the timing of the one or more selected values based on the response data signal.

14. A method of operating a card reading device, comprising:
   modulating a radio frequency carrier of the card reading device with first data according to a protocol for communicating with a contactless smartcard;
   modulating the carrier with second data, the second data from the card reading device simulating inbound communications from the contactless smart card to the card reading device, the second data comprising a simulated response to the first data according to the protocol for communicating with the contactless smartcard; and
   initiating a data exchange with the contactless smartcard at a timing determined by the card reading device,
   wherein the card reading device comprises a transmitter and an antenna, and wherein the transmitter is configured to drive the antenna with a transmit signal and the antenna is configured to radiate the modulated radio frequency carrier in response to the transmit signal.

15. The method of claim 14, wherein modulating the carrier with the second data comprises modulating the carrier at a sub-carrier frequency so as to mimic a modulation characteristic of the contactless smartcard.

16. The method of claim 14, wherein the protocol for communicating with the contactless smartcard is based on ISO 14443 standards.

17. The method of claim 14, wherein the second data comprises at least one command that is invalid according to the protocol for communicating with the contactless smartcard.

18. The method of claim 14, wherein the second data comprises at least two identical commands.

19. The method of claim 14, further comprising varying the timing determined by the card reading device for each contactless smartcard with which the card reading device communicates.

20. The method of claim 14, further comprising:
   detecting a response from the contactless smartcard; and
   modulating the carrier with third data generated by the card reading device, the third data being unrelated to the communication with the contactless smartcard.

21. The method of claim 20 wherein the third data comprises bogus keying material.

22. The method of claim 14, further comprising:
determining a timing of an expected communication from the contactless smartcard comprising a plurality of values; and
modulating the carrier at the card reading device to coincide in time with one or more values selected from the plurality of values.

23. The method of claim 22, further comprising detecting a collision at the timing of the one or more selected values.

24. The method of claim 14, further comprising varying a modulation level of the carrier at the card reading device from time to time.

25. The method of claim 14, further comprising varying an amplitude of the sub-carrier modulation at the card reading device.

26. A computer readable medium having recorded thereon instructions for causing a processor to perform steps for controlling operation of a card reader, the steps comprising:
modulating a radio frequency carrier of a card reader with a first data sequence representative of outbound communications by the card reader;
adjusting modulation characteristics of the radio frequency carrier so as to mimic a modulation of the carrier by a contactless smartcard; and
modulating the radio frequency carrier with a second data sequence representative of an inbound communication from the contactless smartcard to the card reader using the adjusted modulation characteristics.

27. A method of protecting an exchange between a card reader and a contactless smartcard, comprising:
modulating a radio frequency carrier at the card reader with a first data sequence;
determining the timing of an expected response from the contactless smartcard to the first data sequence based on a protocol of the contactless smartcard; and
modulating the carrier at a sub-carrier frequency used by the contactless smartcard for communication with a second data sequence prior to the time of the expected response, the second data sequence being generated by the card reader so as to mimic a modulation of the carrier by the contactless smartcard to communicate an inbound signal to the card reader.

28. The method of claim 27 further comprising modulating the carrier at the sub-carrier frequency with a third data sequence to coincide with the time of the expected response, the third data sequence comprising jamming data generated by the card reader.

29. The method of claim 28, further comprising:
receiving combined data at the card reader comprising the jamming data and response data from the contactless smartcard; and
detecting a collision between the jamming data and the response data; and
recovering the response data from the combined data based on the jamming data.

30. The method of claim 27, further comprising varying a modulation level of the carrier within a predetermined operating range based on a receive capability of the contactless smartcard.

* * * * *

UNITED STATES PATENT AND TRADEMARK OFFICE
CERTIFICATE OF CORRECTION

PATENT NO.         : 8,113,435 B2
APPLICATION NO.    : 12/483110
DATED              : February 14, 2012
INVENTOR(S)        : Thomas Busch-Sorensen It is certified that error appears in the above-identified patent and that said Letters Patent is hereby corrected as shown below:

In column 11, line 44, claim 1, please replace "smart card," with --smartcard,--

In column 12, line 35, claim 14, please replace "smart card" with --smartcard--

Signed and Sealed this
Eighth Day of May, 2012

David J. Kappos
*Director of the United States Patent and Trademark Office*